US007363469B2

(12) United States Patent
Abernathy et al.

(10) Patent No.: US 7,363,469 B2
(45) Date of Patent: Apr. 22, 2008

(54) METHOD AND SYSTEM FOR ON-DEMAND SCRATCH REGISTER RENAMING

(75) Inventors: Christopher M. Abernathy, Austin, TX (US); William E. Burky, Austin, TX (US); James A. Van Norstrand, Jr., Round Rock, TX (US); Albert T. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/390,785

(22) Filed: Mar. 28, 2006

(65) Prior Publication Data

US 2007/0234011 A1    Oct. 4, 2007

(51) Int. Cl.
*G06F 12/00* (2006.01)
(52) U.S. Cl. .................................................... 712/217
(58) Field of Classification Search ................ 712/217; 711/2
See application file for complete search history.

(56) References Cited

U.S. PATENT DOCUMENTS

| 6,854,110 B2* | 2/2005 | Gillies et al. ................ 717/159 |
| 2005/0055541 A1* | 3/2005 | Aamodt et al. .............. 712/217 |
| 2005/0132171 A1* | 6/2005 | Bharadwaj et al. .......... 712/217 |
| 2005/0132172 A1* | 6/2005 | Eichenberger et al. ....... 712/217 |
| 2006/0026389 A1* | 2/2006 | Dinechin et al. ............. 712/200 |

OTHER PUBLICATIONS

Buti, et al., Organization and implementation of the register-renaming mapper for out-of-order IBM POWER4 processors, IBM J. Res. & Dev., vol. 49, No. 1, Jan. 2005, pp. 167-188.

* cited by examiner

*Primary Examiner*—Eric Coleman
(74) *Attorney, Agent, or Firm*—Casimer K. Salys; Dillon & Yudell LLP

(57) ABSTRACT

A method and processor for performing on-demand scratch register reallocation by dynamically adjusting the number of scratch registers from within the pool of rename registers includes initially allocating from a set of physical registers one or more architected registers and a pool of one or more rename registers and allocating from the pool of rename registers an initial number of scratch registers for storing microcode operands. In response to detecting that a fetched instruction requires an additional scratch register beyond the initial number, a selected physical register is reallocated from among the pool of rename registers as the additional scratch register, and a flag is set to indicate the rename register is allocated as the additional scratch register. In response to determining that the additional scratch register is no longer needed, the additional scratch register is deallocated and the flag is reset, such that the selected physical register returns to the pool of rename registers.

7 Claims, 3 Drawing Sheets

| | | |
|---|---|---|
| 202 | ARCHITECTED | 222 |
| 204 | ARCHITECTED | 224 |
| 206 | ARCHITECTED | 226 |
| 208 | ARCHITECTED | 228 |
| 210 | ARCHITECTED | 230 |
| 212 | RENAME | 232 |
| 214 | RENAME | 234 |
| 216 | RENAME | 236 |
| 218 | SCRATCH | 238 |
| 220 | SCRATCH | 240 |

Fig. 2

METHOD AND SYSTEM FOR ON-DEMAND SCRATCH REGISTER RENAMING

BACKGROUND OF THE INVENTION

1. Technical Field

The present invention relates in general to data processing and, in particular, to resource allocation in a processor. Still more particularly, the present invention relates to a method and system for on-demand scratch register renaming in a processor.

2. Description of the Related Art

A typical superscalar microprocessor is a highly complex digital integrated circuit including, for example, one or more levels of cache memory for storing instructions and data, a number of execution units for executing instructions, instruction sequencing logic for retrieving instructions from memory and routing the instructions to the various execution units, and registers for storing operands and result data. Interspersed within and between these components are various queues, buffers and latches for temporarily buffering instructions, data and control information. As will be appreciated, at any one time the typical processor described above contains an enormous amount of state information, which can be defined as the aggregate of the instructions, data and control information present within the processor.

Many microprocessors implement microcode to break complex instructions into smaller operations (a.k.a. internal ops, or iops). To transfer data between iops, the prior art solution defines a small fixed number of General Purpose Registers (GPRs) as scratch registers (a.k.a. extended GPRs, or eGPRs) for use only by microcode. Scratch registers are storage locations dedicated to the storage of operands of microcode instructions. In order to have a compact instruction encoding, most processor instruction sets have a small set of special locations which can be directly named. These registers capable of being directly named are called rename registers, and are storage locations for a future state of an architected register. Register renaming refers to a technique used to avoid unnecessary serialization of program operations imposed by the reuse of registers by those operations. One limiting performance factor in an out-of-order microprocessor design is the availability of GPR rename registers. Under the prior art, the total number of rename registers available is equal to the total number of physical registers less the number of logical registers defined for each thread, because the latest set of committed logical registers must be preserved for the possibility that speculative out-of-order instructions are flushed.

Speaking generically of the prior art, the relationship between available rename registers and physical registers is: Nrename=Nphysical−Nthreads*Nlogical. However, for the known solution—for a microprocessor performing out-of-order instructions with microcode (and thus scratch registers), the relationship becomes Nrename=Nphysical−Nthreads*(Nlogical+Nscratch). The result of the prior art solution is that, for a microprocessor with multiple threads, the number of renames available for computation can become significantly reduced, due in large measure to the prior-art solution for scratch register handling.

SUMMARY OF THE INVENTION

A method and processor for performing on-demand scratch register reallocation by dynamically adjusting the number of scratch registers from within the pool of rename registers includes initially allocating from a set of physical registers one or more architected registers and a pool of one or more rename registers and allocating from the pool of rename registers an initial number of scratch registers for storing microcode operands. In response to detecting that a fetched instruction requires an additional scratch register beyond the initial number, a selected physical register is reallocated from among the pool of rename registers as the additional scratch register, and a flag is set to indicate the rename register is allocated as the additional scratch register. In response to determining that the additional scratch register is no longer needed, the additional scratch register is deallocated and the flag is reset, such that the selected physical register returns to the pool of rename registers.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 illustrates an exemplary embodiment of a physical general purpose register file in accordance with a preferred embodiment of the present invention.

DETAILED DESCRIPTION OF ILLUSTRATIVE EMBODIMENT

Figure 1:
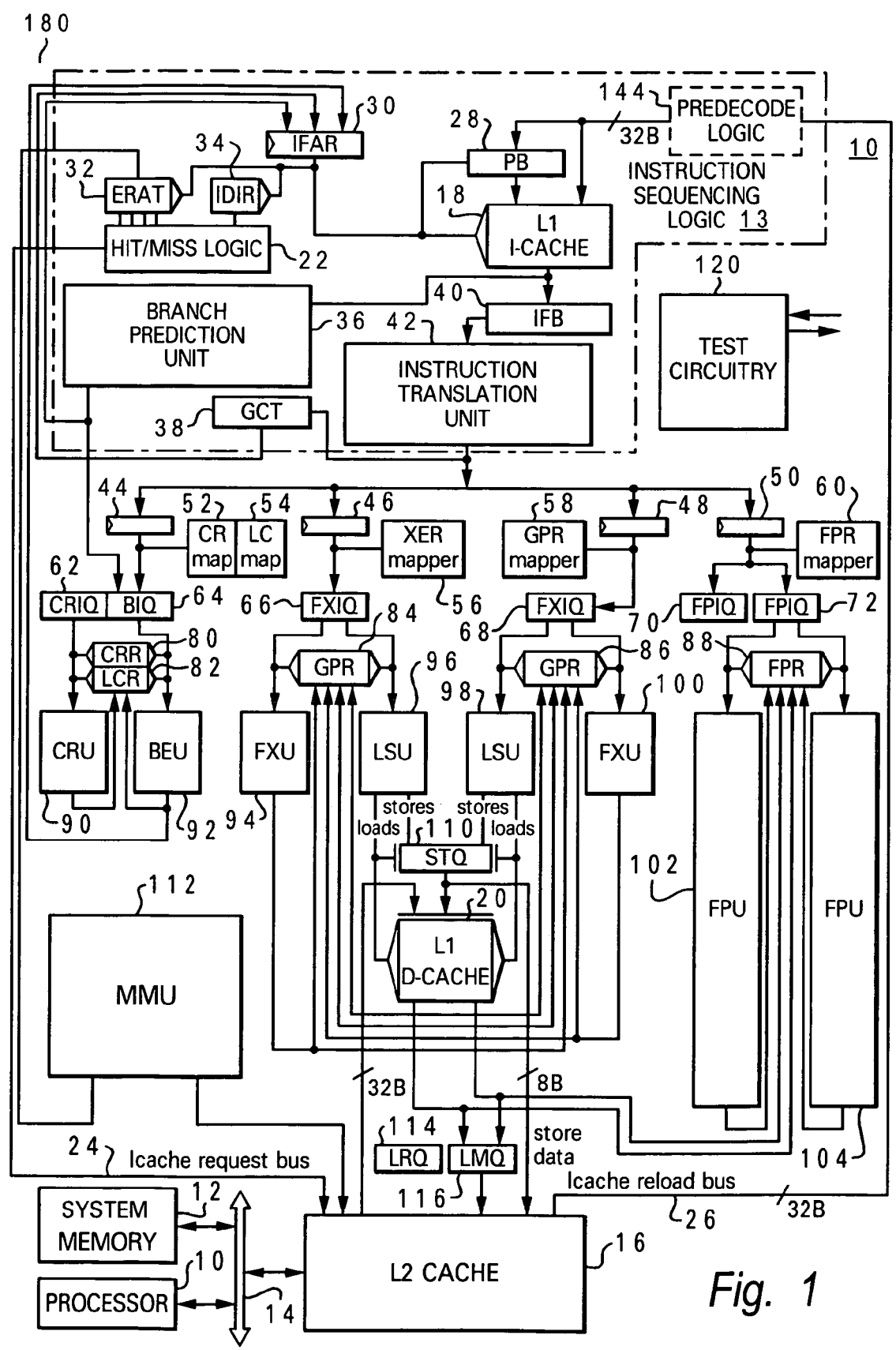
FIG. 1 depicts an illustrative embodiment of a data processing system with which the method and system for on-demand scratch register renaming of the present invention may advantageously be utilized.

With reference now to the figures and in particular with reference to FIG. 1, there is depicted a high level block diagram of an illustrative embodiment of a data processing system for processing instructions and data in accordance with the present invention. In particular, data processing system 180 supports on-demand scratch register renaming.

Data processing system 180 includes multiple processors 10, each of which comprises a single integrated circuit superscalar processor, which, as discussed further below, includes various execution units, registers, buffers, memories, and other functional units that are all formed of digital integrated circuitry. As illustrated in FIG. 1, processor 10 may be coupled to other devices, such as a system memory 12 and a second processor 10, by an interconnect fabric 14 to form a larger data processing system such as a workstation computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which is loaded into prefetch buffer (PB) 28 and L1 I-cache 18 via I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 62-72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

As will be appreciated by those skilled in the art from the foregoing description, the instruction handling circuitry of processor 10 can thus be considered an instruction pipeline in which instructions generally flow from cache memory to instruction sequencing logic 13, to issue queues 62-72, to execution units 90-104 and, for memory access instructions, to one of queues 110, 114, and 116, prior to completion and retirement from GCT 38.

To facilitate testing, processor 10 may optionally include conventional test circuitry 120 (e.g., an IEEE Std. 1149.1-compliant boundary scan interface) coupled between the internal logic illustrated in FIG. 1 and the input/output (I/O) pins of the chip package.

Referring now to FIG. 2, there is illustrated a more detailed description of a physical register file such as GPRs 84 and 86. Physical register file 200 is composed of physical registers 202-220. Physical registers 202-220 are allocated by GPR mapper 58 as architected registers 202-210, rename registers 212-220 and scratch registers 218-220. Each of physical registers 202-220 contains a flag bit 222-240 for indicating if the register is being used as a scratch register. When used as GPRs 84 and 86, physical registers 202-220 store fixed-point and integer values accessed and produced by FXUs 94 and 100 and LSUs 96 and 98. During execution within FXUs 94 and 100 and LSUs 96 and 98, an instruction receives operands, if any, from one or more architected registers 202-210, and a pool 242 of rename registers 212-220, some of which will be configurably designated as scratch registers 218-220 within a physical register file 200 coupled to the execution unit FXUs 94 and 100 and LSUs 96 and 98.

Figure 3:
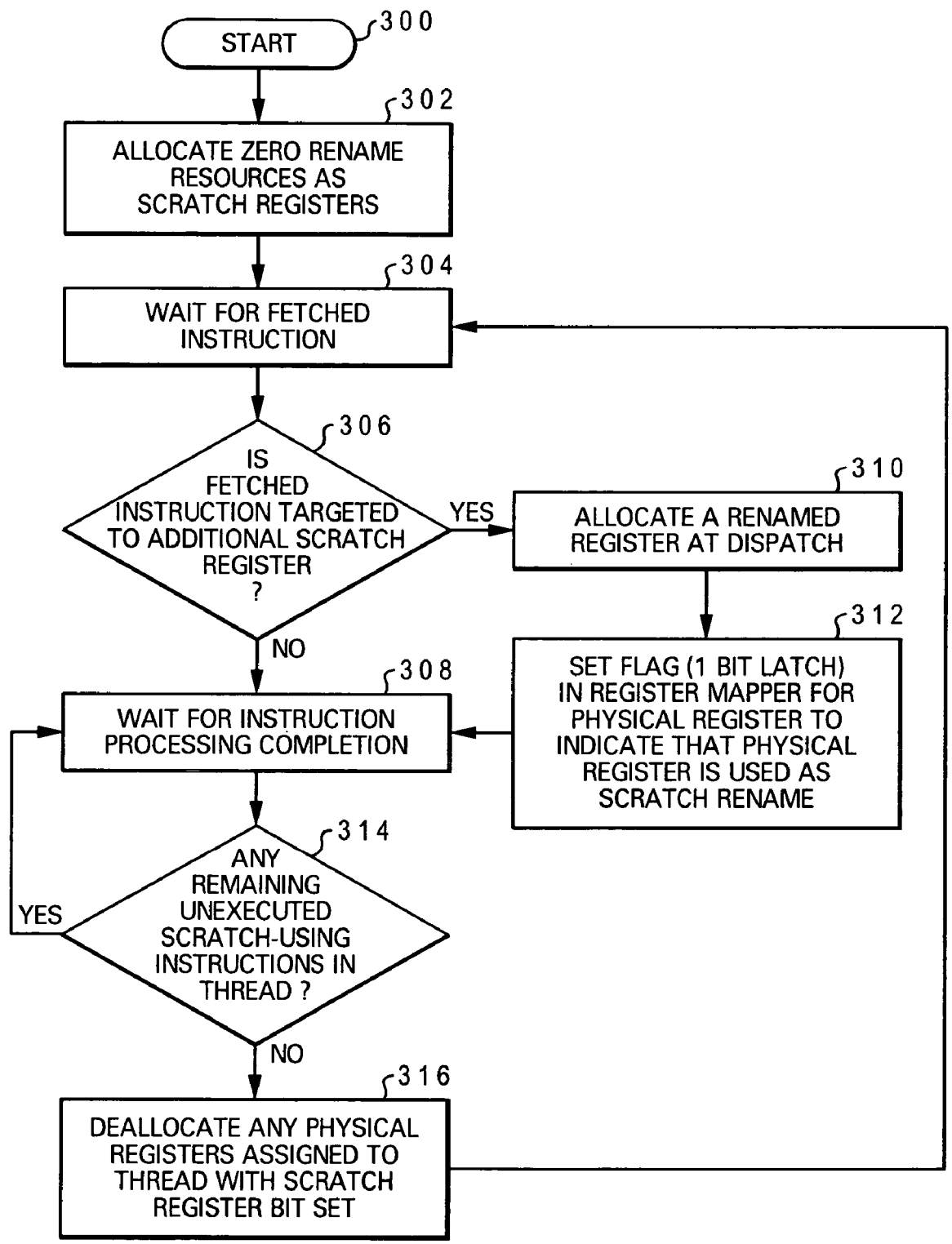
FIG. 3 is a flowchart of a process for on-demand scratch register renaming in a processor in accordance with a preferred embodiment of the present invention.

Turning now to FIG. 3, a flowchart for a process for on-demand scratch register renaming in a processor in accordance with a preferred embodiment of the present invention is depicted. The process starts at step 300 and then moves to step 302, which depicts GPR mapper 58 or XER mapper 56 initially allocating from a set of physical registers 202-220 as one or more architected registers 202-210 and a pool 242 of one or more rename registers 212-220, among which are an initial number of scratch registers 218-220 for storing microcode operands. In a preferred embodiment, that initial number of scratch registers 218-220 will be zero. The process then proceeds to step 304. Step 304 illustrates GPR mapper 58 waiting on a signal from instruction sequencing logic 13 indicating that an instruction has been fetched.

The process next moves to step 306, which depicts GPR mapper 58 detecting, on the basis of input from ITU 42, whether the fetched instruction is targeted to a scratch register, requiring an additional scratch register 218-220 beyond the initial allocation of scratch registers 218-220. If GPR mapper 58 detects, on the basis of input from ITU 42, that the fetched instruction requires an additional scratch register scratch register 218-220 beyond the initial allocation of scratch registers 218-220, then the process proceeds to step 310. Step 310 illustrates GPR mapper 58 reallocating a selected physical register 218 from among the pool 242 of rename registers 212-220 as an additional scratch register 218-220. The process next moves to step 312, which depicts GPR mapper 58 setting a flag 232-240 on the selected physical register 218 from among the pool 242 of rename registers 212-220 (e.g., by setting a single-bit latch) to indicate that the selected physical register 218 is used as an additional scratch register 218-220. The process then proceeds to step 308.

Returning to step 306, if GPR mapper 58 detects, on the basis of input from ITU 42, that the fetched instruction does not require an additional scratch register scratch register 218-220 beyond the initial allocation of scratch registers 218-220, then the process next moves to step 308. Step 308 illustrates GPR mapper 58 waiting for a signal from one of FXUs 94 and 100 and LSUs 96 and 98 indicating that the fetched instruction has been completed. The process then proceeds to step 314, which depicts GPR mapper 58 determining, on the basis of input from ITU 42, whether any unexecuted instructions requiring additional scratch registers 218-220 beyond the initial allocation of scratch registers 218-220 remain in the thread that includes the fetched instruction. If GPR mapper 58 determines, on the basis of input from ITU 42, that any unexecuted instructions requiring additional scratch registers 218-220 beyond the initial allocation of scratch registers 218-220 remain in the thread that includes the fetched instruction, then the process returns to step 308.

Returning to step 314, GPR mapper 58 determines, on the basis of input from ITU 42 indicating detection by ITU 42, that no unexecuted instructions requiring additional scratch registers 218-220 beyond the initial allocation of scratch registers 218-220 remain in the thread that includes the fetched instruction, then the process next moves to step 316. Step 316 illustrates GPR mapper 58 deallocating the additional scratch register 220 and resetting flags 240, such that the selected physical registers 220 return to the pool 242 of rename registers 212-220. The process then returns to step 304.

While the invention has been particularly shown and described with reference to a preferred embodiment, it will be understood by those skilled in the art that various changes in form and detail may be made therein without departing from the spirit and scope of the invention. For example, the present invention is not limited to a particular processor architecture or to processor architecture, but is applicable to any processor architecture.

What is claimed is:

1. A method for performing reallocation, said method comprising:
    initially allocating from a set of physical registers one or more architected registers and a pool of multiple rename registers;
    allocating from said pool of rename registers an initial number of scratch registers for storing microcode operands;

during program execution detecting that a fetched instruction is targeted to a scratch register requiring an additional scratch register beyond said initial number and responsively reallocating a selected physical register from among said pool of rename registers as said additional scratch register;

setting a flag to indicate said rename register is allocated as said additional scratch register; and in response to determining that said additional scratch register is no longer needed, deallocating said additional scratch register and resetting said flag, such that said selected physical register returns to said pool of rename registers.

2. The method of claim 1, wherein said step of reallocating said selected physical register from among said rename registers as said additional scratch register further comprises reallocating a selected physical register from among said rename registers as said additional scratch register at a dispatch of said fetched instruction.

3. The method of claim 1, further comprising determining that said additional scratch register is no longer needed.

4. The method of claim 3, wherein said step of determining that said additional scratch register is no longer needed further comprises determining that no unexecuted instructions remain in a thread containing said fetched instruction requiring said additional scratch register.

5. The method of claim 1, wherein said step of setting said flag further comprises setting a single-bit latch.

6. The method of claim 1, further comprising, detecting that said fetched instruction requires said additional scratch register beyond said initial number.

7. The method of claim 1, wherein said step of allocating from said pool of rename registers an initial number of scratch registers for storing microcode operands further comprises allocating from said pool of rename registers zero scratch registers for storing microcode operands.

\* \* \* \* \*